G. W. HAY.
STERILIZING APPARATUS.
APPLICATION FILED APR. 11, 1918.
1,316,612.
Patented Sept. 23, 1919.
3 SHEETS—SHEET 1.
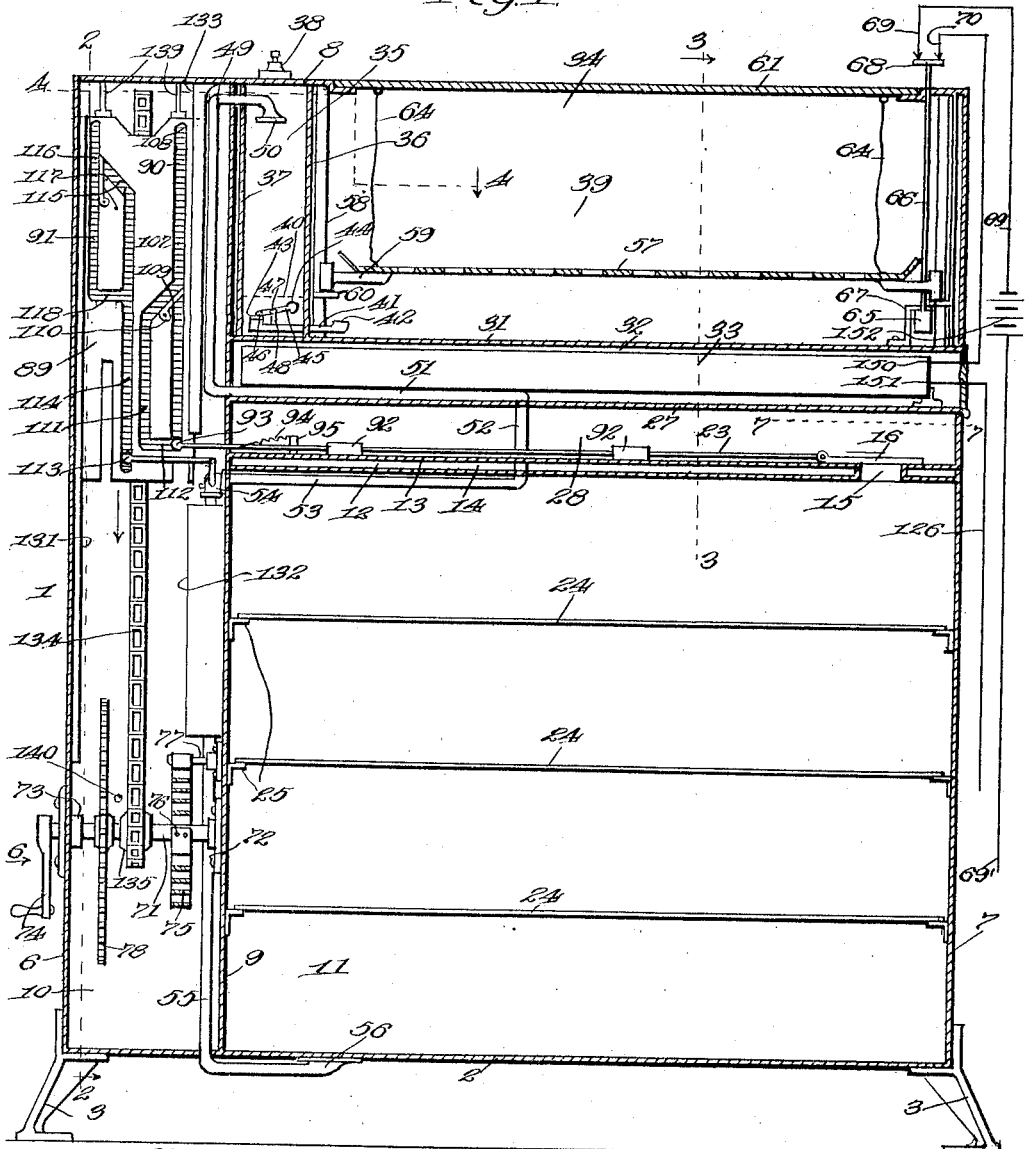
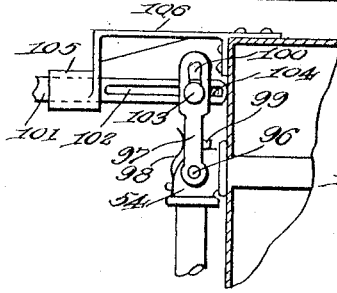
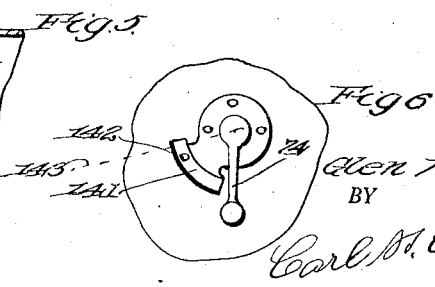
INVENTOR.
Glen W. Hay
BY
Carl M. Crawford
ATTORNEYS.

G. W. HAY.
STERILIZING APPARATUS.
APPLICATION FILED APR. 11, 1918.
1,316,612.
Patented Sept. 23, 1919.
3 SHEETS—SHEET 2.
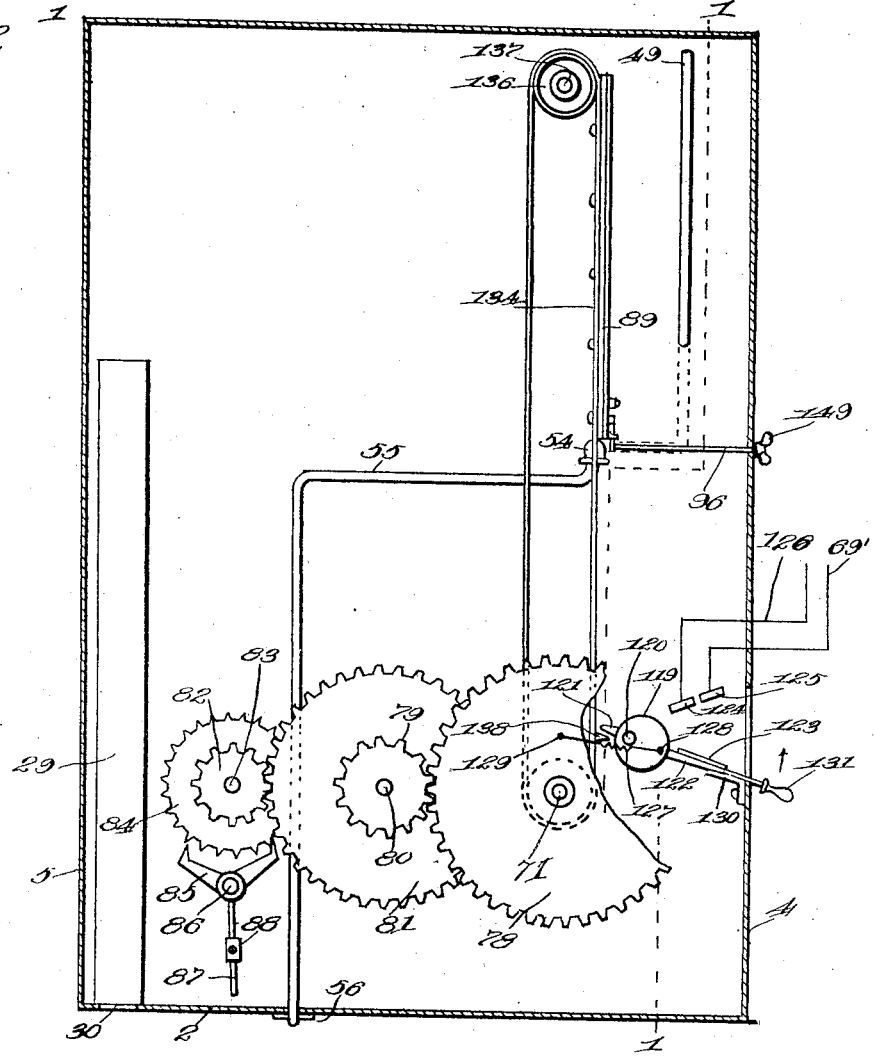
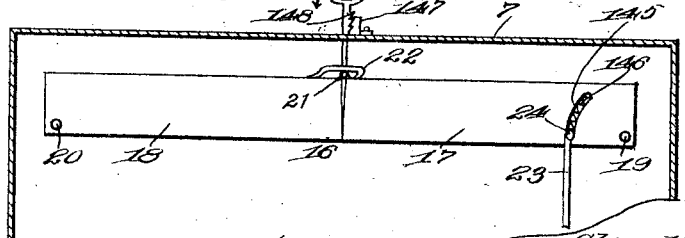
INVENTOR.
BY Glen W. Hay
Carl M. Crawford
ATTORNEYS.

G. W. HAY.
STERILIZING APPARATUS.
APPLICATION FILED APR. 11, 1918.
1,316,612.
Patented Sept. 23, 1919.
3 SHEETS—SHEET 3.
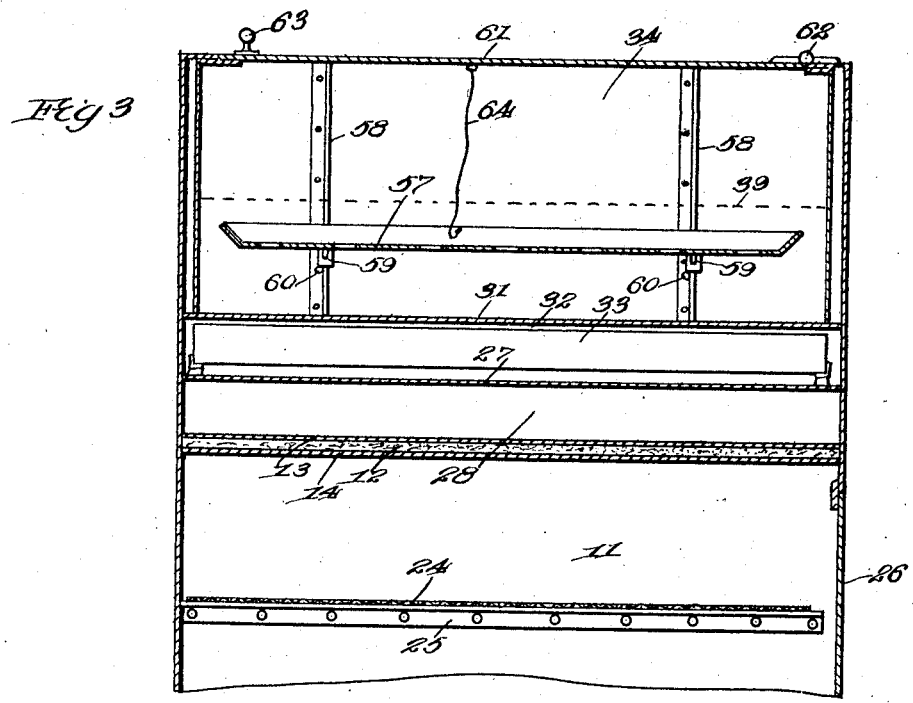
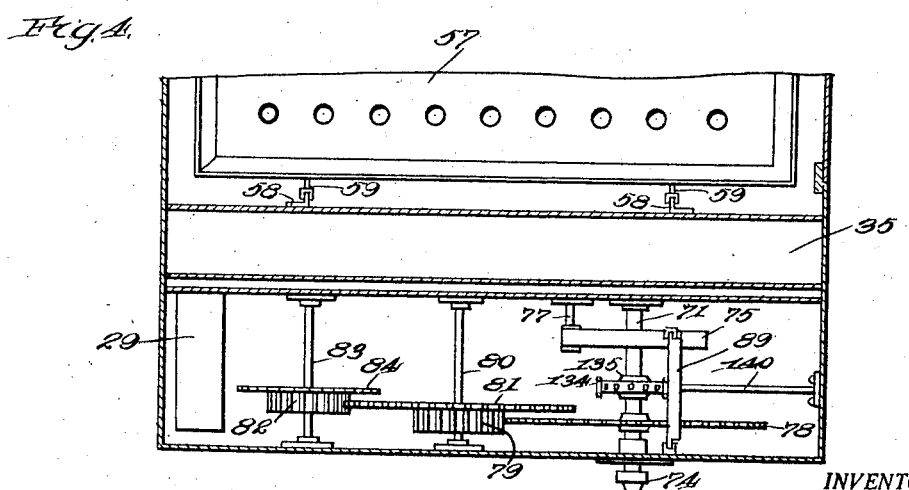
INVENTOR.
Glen W. Hay
BY
Carl M. Crawford
ATTORNEYS.

UNITED STATES PATENT OFFICE.

GLEN W. HAY, OF SPOKANE, WASHINGTON, ASSIGNOR OF ONE-HALF TO G. BURWELL MANN, OF SPOKANE, WASHINGTON.

STERILIZING APPARATUS.

1,316,612.    Specification of Letters Patent.    Patented Sept. 23, 1919.

Application filed April 11, 1918. Serial No. 228,965.

*To all whom it may concern:*

Be it known that I, GLEN W. HAY, a citizen of the United States, residing at Spokane, in the county of Spokane and State of Washington, have invented new and useful Improvements in Sterilizing Apparatus, of which the following is a specification.

This invention relates to improvements in sterilizing apparatus and is especially designed for use in sterilizing instruments, dressings, and the like, for dentists and physicians.

In the usual routine in a dentist's office, and whenever surgical instruments are used by a physician, it is necessary to subsequently sterilize the instruments in boiling water and subject the dressings to a sterilizing application of steam and hot air. As far as is known, these two sterilizing operations have always been carried out in separate and detached sterilizing devices. Furthermore, it has been previously necessary for the assistant to time the sterilization, if the instruments or dressings were required for use in a given time, and if the assistant permitted the water in the instrument sterilizer to completely evaporate, the instruments in the sterilizer would be seriously injured, if not rendered wholly useless.

Among the many features of this invention is that of providing in a unitary structure, a sterilizing apparatus including both the instrument chamber and the chamber for sterilizing the dressings.

A further feature of this invention is to provide a single source of heat for boiling the water in the instrument chamber and supplying the hot air to the dressing chamber, this single source of heat also being utilized to generate steam for delivery to the dressing chamber. Thus if my improved sterilizer employs electrical heating means, a great economy of manufacture results from the fact that only one coil is necessary. This is due to the novel arrangement of chambers which will hereinafter be described.

A further feature of this invention consists in providing controlling mechanism, adapted to be manually energized, and serving during the expenditure of its stored power to regulate the sterilizer throughout a complete sterilizing period or cycle, and then stop, without requiring the attention of either the surgeon or the assistant. In the most improved embodiment of this invention, the controlling mechanism is in the form of clock-work, in which a spring is the energy storing medium and the escapement the retarder for properly timing the period or cycle of operation. During this period or cycle of operation the coil is energized to boil the water in the instrument chamber and also to generate steam in a steam chamber and admission of steam to the dressings chamber is opened. This admission of steam to the dressings chamber is retained open for a period which may be determined, but which probably would be twenty-five or thirty minutes. Then the mechanism closes admission of steam to the dressings chamber and opens admission of hot air thereto and retains the hot air admission open for a fixed or predetermined time such as twenty-five or thirty minutes. After the period of hot air subjection has terminated, then the hot air is shut off and the mechanism, just before it finishes a cycle of movement under the action of the clock spring, will open a controlling switch and deënergize the heating coil.

The instrument chamber requires a relatively large quantity of water in order to provide for evaporation and also immerse the instruments, and therefore in order to obtain a quick generation of steam, a separate steam generating chamber is provided, in accordance with my invention, and in the preferred construction the steam generating chamber is fed from the water in the instrument chamber but the level in the generating chamber is retained fairly low so that only a small quantity of water will be in the generating chamber. Thus steam will be generated in a matter of three or four minutes, sufficient to supply the dressings chamber with the steam sterilization.

This invention also includes improved means for rendering the sterilizing apparatus inoperative when the water in the instrument chamber becomes dangerously low or falls below a pre-determined level so as to avoid burning of any instruments or other apparatus that may be placed in the instrument chamber in the event that there is a too small quantity of water. When the improved apparatus includes an electric circuit, a device is provided for opening the circuit when the water in the instrument chamber becomes too low, thereby rendering the apparatus inoperative.

My invention also provided for utilizing the instrument chamber alone without either sterilizing action in the dressings chamber. Of, if after a sterilizing act the cycle of operation has been completed, and it is desired to sterilize additional instruments, the device provides whereby a new cycle need not be started merely to continue operation of boiling in the instrument chamber. If, perchance, the user desires to thoroughly dry out an additional quantity of dressings, over and above the dressings subjected to hot air treatment by the usual cycle of operation, the invention provides for cutting out steam admission to the dressings chamber and subjecting the contents to a continued subjection of hot air sterilization. It will be understood that it is always necessary to dry out the dressings, after they have been subjected to steam sterilization, and therefore it is never necessary to independently manipulate air admission.

Other features and objects of this invention will be more fully described in connection with the accompanying drawings, and will be more particularly pointed out in and by the appended claims.

In the drawings:

Figure 1, is a vertical transverse sectional view on line 1—1 of Fig. 2.

Fig. 2, is a sectional view on line 2—2 of Fig. 1.

Fig. 3, is a sectional view on line 3—3 of Fig. 1.

Fig. 4, is a sectional view on line 4—4 of Fig. 1.

Fig. 5, is an enlarged detail view of the feed valve, and its actuating means.

Fig. 6, is a view in elevation of a portion of the crank side of the casing.

Fig. 7, is a sectional view on line 7—7 of Fig. 1 showing the hot air admission valve in plan.

Like characters of reference designate similar parts throughout the different figures of the drawings.

As illustrated, the device of my invention is embodied in unitary structure of cabinet form, the same being self-contained and portable, as generally designated at 1. This sterilizing cabinet is provided with a bottom wall 2, to which suitable legs or supports 3 may be attached. The cabinet has a front wall 4, a rear wall 5, side walls 6 and 7 and a top wall 8. The cabinet is divided or partitioned vertically by a partition wall 9 which divides the cabinet off, as regards its interior, into a controlling mechanism chamber 10 and a dressings chamber 11. A horizontal wall 12 partitions off the cabinet and joins wall 9 and wall 7 to form the top of the dressings chamber 11. This top wall 12 is preferably a double wall, as indicated at 13, the intervening space being filled by asbestos 14 or like material functioning as an insulator against transmission of heat into the chamber 11. The wall 12 is provided with a hot air inlet opening 15 through which hot air is admitted to the dressings chamber 11. Hot air admission to chamber 11 is controlled by a hot air admission valve 16, more particularly shown in Fig. 7. In order to get a quick and full opening with a limited movement, this valve 16 may be made in sections 17 and 18, section 17 being pivoted to wall 12 at 19 and section 18 being pivoted to wall 12 at 20. The sections 17 and 18 are pivotally connected with each other at 21, the pivot 21 operating in a slotted arm 22. Pivot 21 may be connected with section 17 and the slotted arm 22 may be secured to section 18. An operating rod 23 is pivoted to section 17 and the remaining end of said rod is connected with a cam operating means which will later be described. It will thus be seen that when the rod 23 is actuated to the left of Fig. 1 for a very slight distance, there will be a corresponding opening movement imparted to the valve sections 17 and 18 to open passage 15. This will admit hot air to the dressings chamber 11. The dressings chamber 11 is provided with a plurality of trays 24, removably mounted upon support 25, on which the materials to be sterilized with steam and hot air will be disposed. Preferably, the shelves or trays 24 will be formed of some kind of foraminated material. A suitable door 26 will afford ready ingress to the dressings chamber. A horizontal wall 27, joining walls 7 and 9, forms an air supply chamber 28 to which air is supplied for heating purposes, for subsequent delivery to the dressings chamber 11. One or more supply pipes, as indicated at 29, will deliver to said supply chamber, the pipe 29 opening at 30 for air ingress through the bottom 2.

Above wall 27 is a wall 31, joining walls 7 and 9, and which wall 31 forms, with wall 27, a coil chamber 32. Broadly speaking, this chamber 32 is a chamber for containing heating means, which in the present construction, is in the form of an electric coil 33. It will be seen that wall 27 is a very thin wall, not insulated in any manner, and therefore heat from the heating chamber 32 will quickly radiate from wall 27 to heat the air in chamber 28 and always have a supply ready when the valve 16 is open.

Wall 31 forms the bottom of an instrument sterilizing chamber 34. The instrument chamber 34 is located upon one side of a quick steam generating chamber 35, which latter is formed by a partition wall 36 which extends parallel with wall 9. On the left hand side of chamber 35, an additional wall 37 is provided, forming with wall 9 a double wall for retaining heat in the steam generating chamber to facilitate a supply of steam immediately responsive to the action of heating coil 33. It will be noticed that the wall 31 also forms the bottom of steam generating chamber 35 and therefore heat from the coil 33 is transmitted to said chamber through said wall. In the upper portion of the steam generating chamber 35 I disposed a safety valve 38, of any improved construction, this valve 38 effectively preventing tightening or other defective functioning through the steam supply pipe hereinafter described. The instrument chamber 34 will be provided with a considerable volume of water, say for instance to the level 39, and therefore it will take some considerable time for this water to be brought to the boiling point. However, in chamber 35, a reduced quantity of water 40 is necessary, and because the quantity of water is of a minimum volume, means are provided for maintaining this limited volume practically constant. As shown, the generating chamber 35 is fed from the instrument chamber 34 by a pipe 41 extending through wall 36, the pipe 41 having an inlet opening 42 in chamber 34 and a valve controlled opening 43 in chamber 35. The valve is controlled by a float 44 mounted upon one end of a lever 45, the other end of the lever being pivoted at 46 to the valve, and the lever being pivoted between the same at 47 to a support 48. It will be seen that as the level 40 falls, the float will open the valve 43 and supply more water, and as the level 40 rises, the float 44 will close ingress of water to the chamber 35.

A steam supply pipe 49 projects through the double wall of the chamber 35 and has a valve or flared intake end 50 for ingress of the steam into said pipe from chamber 35. Pipe 49 extends downwardly in chamber 10 and through wall 9 into chamber 32, as indicated at 51. By extending a certain length of the pipe into chamber 32, the heating means will evaporate any water of condensation which the pipe may contain. From chamber 32 the steam supply pipe extends downwardly, at 52, into chamber 11, as indicated at 53, and out through wall 9 into chamber 10 where the supply pipe is provided with a steam controlling valve 54. From valve 54, the pipe extends downwardly, as indicated at 55, and has a terminal 56 which delivers to the dressings chamber 11 through the bottom wall 2.

Again referring to the instrument chamber 34, the same is provided with a suitable tray 57, preferably perforated, upon which the instruments to be sterilized in boiling water may be placed. It is necessary to elevate the tray out of its normal submersed position, in order to get access to the instruments disposed thereon, and therefore I have provided the chamber 34 with vertical guides 58, the tray 57 being provided with shoes 59 whereby the tray will be held in a horizontal position irrespective of its degree of elevation. The rails 58 may be provided with adjustable studs 60 for limiting descent of the tray 57 in the water 39, these studs regulating the degree of submergence of the tray. The top wall 8 is provided with a lid 61, hinged at 62, and having a grip 63 whereby the lid may be elevated to afford access to and from the instrument chamber 34. Suitable means such as chains 64 may be attached to the lid and the tray 57 so that when the lid is elevated, the tray 57 will be raised above the water level in the chamber.

Sometimes, a dentist or his assistant will forget to refill an instrument sterilizing chamber, and when the water boils down either the sterilizer or the instruments in the chamber thereof will be injured. Therefore, means is provided for rendering the sterilizing apparatus inoperative, when the water level falls below a pre-determined point. As illustrated, I have shown a restrained float 65 having a rod 66 extending through a guide 67. The guide 67 is mounted upon the bottom wall 31, of the instrument sterilizing chamber, and limits elevation of the float 65 under its own buoyancy, above a pre-determined point. However, this guide permits the float 65 to descend when the water level falls below a pre-determined point. The rod 66 projects upwardly through the chamber 34 and is provided on its terminal end with a circuit closer 68 which normally closes a circuit through terminals 69 and 70, when the chamber is provided with a normal or more than normal supply of water. However, when the water level falls below a predetermined point, the float 65 will descend and the circuit closer 68 will open the circuit thereby rendering the heating coil inoperative. This will safeguard the sterilizer and the instruments therein from injury. The circuit referred to, will be hereinafter more fully described in detail.

Science has determined that perfect sterilization by water, hot air or steam, requires a pre-determined minimum exposure or subjection of the instruments or articles to be sterilized. Thus it has been determined that sterilization by steam, as regards dressings, may be completed in from twenty-five to thirty minutes. The drying action necessary, subsequent to steam sterilization, and which drying action also functions to sterilize, generally requires from twenty-five to thirty minutes. Sterilization by boiling water may be said to be completed in from fifty to sixty minutes. Now it is one of the objects of this invention to provide controlling mechanism, adapted to be energized by the user, and when so energized, will operate the sterilizer to complete a cycle of sterilizing operation, the device needing no further attention after it has been energized.

I will next describe my improved controlling mechanism governing the action of my improved sterilizer.

An actuating shaft or arbor 71 is shown journaled in a bearing 72 mounted on wall 9, and projects through wall 6 where it is journaled in a bearing 73. Exteriorly of the wall 6, an operating member such as a crank 74 is fixed on said arbor. In the chambers 10, a prime mover, such as a clock spring 75 has one end 76 fixed to said arbor 71 and the remaining end of said spring 75 is anchored, as indicated at 77 to the wall 9. Retarding action of shaft 71, under operation of spring 75, is provided by means of a clock train including a major wheel 78, mounted upon shaft 71, and meshing with a hub pinion 79 mounted on shaft 80. Fixed on shaft 80 is wheel 81 which meshes with hub wheel 82 mounted upon shaft 83. An escapement wheel 84 on shaft 83 co-acts with an escapement pawl 85, pivoted at 86. The escapement pawl 85 has a pendulum stem 87 provided with an adjustable weight 88.

Now it will be seen that the function of this clock train, including the escapement, is to control rotation of shaft 71, under the action of spring 75, so that shaft 71 will make a given number of revolutions in a given time.

Reference will next be made to my novel form of cam mechanism for sequential and automatic operation of the steam control valve 54 and the hot air ingress valve 16. I will also now describe the main controlling switch for energizing the heating coil.

My improved controlling mechanism includes a cam plate 89, which is provided with two cam paths. One cam path is generally indicated at 90, and the same controls the hot air admission valve, the remaining cam path is generally indicated at 91, and this controls the steam supply valve 54. The actuating rod 23 of the hot air admission valve extends through suitable guides 92 and is provided on its free end with a cam projection 93. A spring 94 is connected with said rod 23 and also with a stop 95 so as normally to hold the valve 16 in a closed position.

The steam valve 54 is provided with a valve spindle 96, on which an actuating arm 97 is mounted. In Figs. 1 and 5, the valve is shown in an over closed position, in other words, the valve is shown closed over and above the necessary closing movement to ordinarily close the valve. A flat spring 98 is secured to the valve 54 and engages the arm 97 to normally hold the same against stop 99, in a closed position. Arm 97 is slotted, at 100, and a link 101, slotted at 102, is connected with said arm by a pin 103. A spring 104 is interposed between said pin 103 and the right-hand end of slot 102 so as to permit link 101 to move to the left of Fig. 1 without moving arm 97, when the latter is manually held in a closed position, as hereinafter more fully described. However, when the arm is free, then the movement of the link 101 to the left of Fig. 5 will move arm 97 into a valve opening position. A guide 105 carried by a bracket 106, mounted on wall 13, serves to guide the link 101 to a straight reciprocating movement.

When the cam plate 89 is moved downwardly in the direction of the arrow shown in Fig. 1, the projection 93 will remain stationary, and will travel in cam path 107 until the terminal 108 has reached the position occupied by projection 93. Thus throughout the downward and complete travel of the cam plate 89 from the position as shown in Fig. 1, to a starting position, the hot air admission valve 16 will remain closed. Upon return movement of the cam plate 89 upwardly toward the position occupied in Fig. 1, the cam projection 93 will travel downwardly in the cam path 107 until it is shifted by switch 109, pivoted at 110, into cam path 111. This will serve to open the hot air admission valve 16 and hold the same open until the cam plate 89 has again reached the position shown in Fig. 1, whereupon the spring 94 will cause the projection 93 to travel transversely in the cam path 112, back to the position shown in Fig. 1. Thus it will be seen, that in the latter half of the return travel of the cam plate 89, the admission valve 16 will be opened to admit hot air to the dressings chamber 11. The time of admission, or the period through which the valve 16 is open, may not only be regulated by the length of the section 111, of the cam path, but also by regulating the weight 88 on the escapement to either decrease or prolong the period through the clock-work. It will be understood that the shifting switch 109 normally seeks the position shown by gravity, and will permit passage of the projection 93 beyond it, or upwardly of Fig. 1, but will shift the projection 93 to the left of Fig. 1, on upward movement of the cam plate 89.

Next tracing the action of cam path 91, on the link 101, which is provided with a cam projection 113, it will be seen that upon downward movement of the cam plate 89 the projection 113 will traverse the straight section 114 until the inclined section 115 reaches the projection 113. Then the projection 113 will be shifted into section 116, of cam path 91. Cam switch 117 will be spring controlled to normally seek the position shown in Fig. 1. Therefore, upon completion of the downward movement of cam 89, the steam valve 54 will have been opened, or just previously to such downward movement. On the upward movement, of cam plate 89, valve 54 will be retained in an open position throughout the length of section 116. When the projection reaches section 118, then spring 98 will return the parts to section 114 and close the valve 54. However, it will be seen that during the first portion of the upward travel of cam plate 89, the steam valve will have been held open to permit of delivery of steam to the dressings chamber, whereas during this portion of the movement the valve 16, for admission of hot air, will have been closed and retained closed. Immediately after closing of the steam valve, the hot air valve 16 will have been opened and retained opened throughout the remainder of the upward travel of cam plate 89, to the position shown in Fig. 1.

Thus the complete cycle of automatic operation consisting in the sequential opening of steam valve 54 and subsequent closing thereof, and the opening and closing of hot air valve 16, will now be understood.

When the cam plate 89 descends to its lowermost position, it actuates a controlling switch which I will now describe in detail. Said controlling switch, as shown, comprises a disk 119 eccentrically pivoted at 120. The disk has a projection 121 adapted to be engaged by a lower edge of the cam plate 89 when the latter reaches an extreme lower position. Projecting from disk 119, is a switch member 122 carrying a conducting plate 123. When the disk 119 is shifted by the plate 89, the member 122 is thrown into an upper position, into which position the plate 123 is thrown into contact with terminals 124 and 125 thereby closing circuit through limbs 69 and 126.

In order to prevent destructive arcing, a contractal spring 127 is connected at 128 with disk 119, and to any suitable stationary part, as indicated at 129. A stop 130 limits movement of the switch member in the direction shown, and the terminals 124 and 125 limit movement of the switch member in the opposite direction. Member 122 is provided with a projection 131 extending through a slot in the wall 4, to provide for manual operation of the controlling switch, independently of the mechanism now being described.

The cam plate 89 is shown as being held to a straight line of movement by guides 131, 132 and 133. Movement is transmitted to the cam plate 89 from the shaft 71, in the particular embodiment shown, by an endless chain 134, secured to said cam plate 89, and trained about a wheel 135, on said shaft 71, and a wheel 136, on shaft 137. I have explained how downward movement of the cam plate 89 would strike the projection 121 and shift the controlling switch into a circuit closing position, and I will now call reference to a lug 138 on chain 134, which is adapted to engage projection 121 and throw the controlling switch into the position shown in Fig. 2, which is a circuit opening position. Thus when the cam plate reaches the top position shown in Fig. 1, the controlling switch will be thrown into a circuit opening position thereby cutting out the heating coil. The clock work mechanism will be brought to a position of rest by the cam plate 89 engaging suitable stops 139. A stop 140, may limit downward movement of the cam plate 89.

Now it will be clear from the foregoing that by giving the crank 74 a few turns, the spring 75 will be energized and the cam plate 89 will be brought to a lower position from the position shown in Fig. 1. Upon return of the cam plate 89, to the position shown in Fig. 1, under retarding action of the clock train, a complete cycle of sterilizing operation will have been completed, viz., the heating of the water in the instrument chamber 34, the generation of steam in chamber 35 to supply the dressings chamber, admission of steam to the dressings chamber for a pre-determined period and then a shut-off of steam, and admission of hot air to the sterilizing chamber for a pre-determined period, and finally a shut-off of the hot air. It will also be clear how the controlling switch has been closed upon downward movement of the cam plate 89 and opened upon upward movement thereof.

At this point it is desired to call attention to the advantage of the novel association of the instrument chamber 34, the steam generating chamber 35, and the dressings chamber 11, in such a manner that a single heating coil will supply the heat for all of said chambers, thereby saving the initial cost and maintenance of an additional coil or other heating means.

Under certain conditions, the user might desire merely to sterilize instruments in the sterilizing chamber, in which event, according to my invention it would not be necessary to energize the controlling mechanism. A segment 141 is mounted abreast of the crank 74, and a stud 142 is adapted for insertion into the segment 141. Now by simply turning the crank 74 from the position shown in Fig. 6, to the dotted line position indicated at 143, the lug 138 would be retracted from the projection 121 sufficiently so that by grasping the grip 131 and moving the same upwardly in the direction of the arrow, the controlling switch could be closed, thereby energizing the heating coil 33, without moving the cam plate 89 sufficiently to either open the steam valve 54 or the hot air valve 16. Thus by this simple adjustment, the usual cycle of operation would be avoided, where it was only desired to utilize merely one of the functions of the sterilizer. It will also be noted that during such special utility of the sterilizing chamber, such use would be indefinitely continued as long as the switch was closed. The user would soon accustom himself to watching the sterilizer in case he himself interrupted the operative cycle whereby the sterilizer would render itself inoperative.

In some instances, the user might desire a further application of hot air, in addition to that applied by one cycle of operation. In other words, he might have some additional dressings which he desired to put into the chamber 11, after the cycle of steam and hot air application had been completed.

The valve 16 is provided with a manually operable extension 144, projecting through wall 7. Rod 23 is connected with section 17 by means of a slot 145 in the latter, and therefore it is possible to open valve 16, by pushing on operating handle 144, in the direction of the arrow shown in Fig. 7, irrespective of the position of the cam plate 89. In order that the rod 23 may actuate the valve 16 to close the same, a spring 146 is interposed in said slot 145 so as not only to permit the valve 16 to be independently opened, but also to permit the rod 23 to exercise closing movement on said valve 16. When the valve 16 is manually opened against the action of spring 146, a spring detent 147 may engage teeth 148 on operating member 144 to hold the same in the position to which it is adjusted. Now therefore, after an operating cycle has been completed, where it was desired to have an additional application of hot air, the crank 74 would simply be shifted to the dotted line position 143, and then locked by the stud 142, and the operating member 144 adjusted to open the hot air valve. This adjustment would energize the heating coil 33, indefinitely, as long as the adjustment was held, and as long as the switch member 122 was left in a circuit closing position.

Assuming for some reason, the user might want a prolonged sterilizing action of steam, to be followed by whatever hot air subjection he desired, then, and in that event, the crank would be locked by the stud 142 and the switch member 122 would be thrown into a circuit closing position and the winged nut 149 Fig. 2, would be turned against the action of spring 98, to open valve 54. Winged nut 149 is mounted upon the spindle 96. Any suitable locking means could be provided for holding spindle 96 in a valve opening position. Thus the slots 100 and 102 would permit the arm 97 to occupy a valve opening position, to the left of that shown in Fig. 5.

Now it will be clear that I have provided means whereby a complete sterilizing cycle of operation may be obtained, without requiring any attention upon the part of the user aside from merely starting and energizing the sterilizer. Furthermore, it will be seen that I can singly energize the device for a prolonged or indefinite period, either to utilize the instrument sterilizing chamber alone, steam sterilizing in the dressings chamber alone, or hot air sterilizing action in the dressings chamber. Furthermore, any one of these special sterilizing actions may be initiated subsequent to or independent of a completed cycle of operation. It will be seen that there are two sterilizing chambers, one for the boiling water and one for admission of the steam and hot air. The sterilizing mediums consist of the boiling water, the hot air, and the steam, three in number, thus, the sterilizing mediums are in excess in number with respect to the number of chambers.

The electric circuit is very simple and may be briefly described by stating that the limb 70 connects with the heating coil, at 150, and limb 126 leads from said coil 33, at 151, and terminates at terminal 124. Limb 69' leads from terminal 125 to one terminal of the force of current 152. Limb 69 leads from the remaining pole of the source of current and terminates opposite the terminal of limb 70.

It is believed that the novelty and utility of my invention will be clearly understood from the foregoing description, and while I have herein shown and described one specific form of my invention, I do not wish to be limited thereto except for such limitation as the claims may import.

I claim:—

1. In a dentist and surgeon's sterilizer, a hot water instrument sterilizing chamber, a combined steam and hot air sterilizing chamber for dressings, a heater for boiling the water in said instrument chamber and supplying hot air to said dressings chamber, means for supplying steam to said dressing chamber, and controlling mechanism for causing operation of said heater for a predetermined time and then shutting it off to admit steam for a predetermined period and then hot air for a predetermined period to said dressing chamber.

2. In a dentist and surgeon's sterilizer, a hot water instrument sterilizing chamber, a combined steam and hot air sterilizing chamber for dressings, a heater for boiling the water in said instrument chamber and supplying hot air to said dressings chamber, a source of supply of steam for said dressings chamber, and controlling mechanism for causing operation of said heater for a predetermined time and then shutting it off and first admitting steam to said dressings chamber and then shutting it off after a fixed period and finally admitting hot air to said dressings chamber for a fixed period and shutting it off, the final shut-off of the hot air being substantially co-incident with shut-off of the heater.

3. In a dentist and surgeon's sterilizer, a hot water instrument sterilizing chamber, a combined steam and hot air sterilizing chamber for dressings, a heater for boiling the water in said instrument chamber and supplying hot air to said dressings chamber, means for supplying steam to said dressings chamber, and controlling mechanism for causing operation of said heater for a pre-determined time and then shutting it off and first admitting steam to said dressings chamber for a fixed period and then hot air for a fixed period, and means for rendering the sterilizer in-operative when the water in said instrument chamber falls below a pre-determined level.

4. In a dentist and surgeon's sterilizer, a hot water instrument sterilizing chamber, a combined steam and hot air dressings sterilizing chamber, a source of supply of heat for said instrument and dressings chambers and a source of supply of steam for said dressings chamber, and controlling mechanism adapted to be energized for operation throughout a fixed cycle for causing supplies of steam and heat to said chambers for fixed periods and then shutting off such supplies at least upon completion of the operative cycle of said mechanism.

5. In a dentist and surgeon's sterilizer, a hot water instrument sterilizing chamber, a combined steam and hot air sterilizing chamber for dressings, a source of supply of heat and steam for said chambers, and controlling mechanism adapted to be energized for operation throughout a fixed cycle for causing supplies of steam and heat to said chambers for fixed and different periods and then shutting off such supplies at least upon completion of the operative cycle of said mechanism, and means for preventing delivery of steam to said dressings chamber without interrupting the cycle of operation of said mechanism.

6. In a dentist and surgeon's sterilizer, a hot water instrument chamber, a combined steam and hot air sterilizing chamber for dressings, a heater for boiling the water in said instrument chamber and supplying hot air to said dressings chamber, means for conveying steam generated by said heater to said dressings chamber, cam means for controlling admission of steam and hot air to said dressings chamber, a switch for controlling said heater, and clockwork for actuating said cam means and switch.

7. In a dentist and surgeon's sterilizer, a hot water instrument sterilizing chamber, a dressings sterilizing chamber, a quick steam generating chamber, means for supplying water from said instrument chamber to said generating chamber and maintaining the level low in the latter chamber, and said generating chamber being in communication with said dressings chamber for delivery of steam to the latter, a heater for boiling water in said instrument and generating chambers, and mechanism for starting and maintaining operation of said heater for a fixed period and controlling admission of steam for a fixed period to said dressings chamber within the period of operation of said heater.

8. In a dentist and surgeon's sterilizer, a hot water instrument sterilizing chamber independently accessible from the exterior of said sterilizer, a dressings chamber, heating means for boiling water in said instrument chamber and generating steam and supplying hot air to said dressings chamber, a hot air controlling valve, a steam controlling valve, means manually movable to open and retain said hot air valve open for a fixed period and then close said valve and open said steam valve and retain it open and then close the same.

9. In a dentist and surgeon's sterilizer, a hot water instrument sterilizing chamber, a dressings chamber, heating means for boiling the water in said instrument chamber and supplying hot air to said dressings chamber and generating steam for said dressings chamber, a hot air valve for controlling admission of hot air to said dressings chamber, a steam valve for controlling admission of steam to said dressings chamber, cam means manually movable in one direction for opening said steam valve, and timed mechanism for returning said cam means and said cam means holding said steam valve open for a portion of its return travel and then closing said steam valve and opening said hot air valve and holding said hot air valve open for the remainder of its travel and then closing it.

10. In a dentist's and surgeon's sterilizer, a hot water instrument sterilizing chamber, a combined steam and hot air sterilizing chamber for dressings, a source of supply of heat and steam for said chambers, and controlling mechanism adapted to be energized for operation throughout a fixed cycle for causing supplies of steam and heat to said chambers for fixed and different periods and then shutting off such supplies at least upon completion of the operative cycle of said mechanism, means for preventing delivery of steam to said dressings chamber without interrupting the cycle of operation of said mechanism, and means for prolonging delivery of hot air to said dressings chamber, substantially as described.

11. In a dentist's and surgeon's sterilizer, a hot water instrument sterilizing chamber, a quick steam generating chamber, a combined steam and hot air sterilizing chamber, and a single heater in direct heating relation with respect to all of said chambers, substantially as described.

12. In a dentist's and surgeon's sterilizer, a hot water instrument sterilizing chamber, a combined steam and hot air sterilizing chamber for dressings, and a single heater in heating relation to both of said chambers, substantially as described.

13. In a dentist's and surgeon's sterilizer, a hot water instrument sterilizing chamber, a quick steam generating chamber communicating with said instrument chamber for its source of supply of water, a heating coil beneath said instrument and generating chambers for heating the water therein, and a dressings chamber below said coil and in communication with a supply of hot air heat by said coil, substantially as described.

14. In a sterilizing apparatus, a unitary cabinet structure having in its upper portion a hot water instrument chamber and a quick steam generating chamber, a coil chamber below said instrument and generating chambers and having a coil for heating said chambers, an air supply chamber below and in heated relation to said coil chamber, a dressings chamber below and in communication with said air supply chamber, and a controlling mechanism chamber extending vertically alongside of all of said chambers, substantially as described.

15. In a dentist and surgeon's sterilizer, a plurality of sterilizing chambers, a heater for said chambers, and controlling mechanism for causing operation of said heater for a predetermined period and then shutting it off.

16. In a dentist and surgeon's sterilizer, a plurality of sterilizing chambers, a heater for said chambers, and controlling mechanism for causing operation of said heater for a predetermined time for sterilizing action in both chambers and arresting sterilizing action in one chamber prior to terminating sterilizing action in the other chamber.

17. In a dentist and surgeon's sterilizer, a sterilizing chamber, means for supplying sterilizing mediums of different character to said chamber, and controlling mechanism for causing a supply of a sterilizing medium of one character to said chamber for a period of time and then shutting it off and causing a supply of another character of sterilizing medium for a period of time to said chamber and then shutting it off.

18. In a dentist and surgeon's sterilizer, a plurality of sterilizing chambers, means for supplying sterilizing mediums of different character in excess in number to the number of chambers, and controlling mechanism for causing periodic sterilizing operation in said chambers and utilizing all of said sterilizing mediums.

19. In a dentist and surgeon's sterilizer, a plurality of sterilizing chambers, means for supplying sterilizing mediums of different character in excess in number to the number of chambers, and controlling mechanism adapted to be started to operate through a predetermined cycle and causing periodic sterilizing operation in all of said chambers for different durations of time and utilizing all of said sterilizing mediums and shutting off all sterilizing operation in all of said chambers at the completion of the operative cycle of said mechanism.

20. In a dentist and surgeon's sterilizer, a plurality of sterilizing chambers, means for supplying sterilizing mediums of different character in excess in number to the number of chambers, and controlling mechanism adapted to be started and then driven throughout a predetermined cycle and causing sterilizing operation with said different mediums in said chambers for different periods, and means for prolonging sterilizing operation in a selected chamber beyond and in excess of the time required for said predetermined cycle.

21. In a sterilizing apparatus, a unitary cabinet structure having in its upper portion a hot water instrument chamber, a coil chamber below said instrument chamber and having a heater for heating said chamber, an air supply chamber below and in heated relation to said coil chamber, and a dressing sterilizing chamber below and in communication with said air supply chamber.

22. In a sterilizing apparatus, an instrument sterilizing chamber adapted to contain a quantity of water sufficient to permit of immersing the instruments therein, a quick steam generating chamber in water supply communication with said instrument chamber, means for controlling the supply of water to said generating chamber to maintain the level therein low, a heater in heating relation with both chambers, and a dressings sterilizing chamber in supply communication with said generating chamber.

In testimony, that I claim the foregoing as my own, I hereby affix my signature.

GLEN W. HAY.

Copies of this patent may be obtained for five cents each, by addressing the "Commissioner of Patents, Washington, D. C."